(12) United States Patent
Honjo et al.

(10) Patent No.: US 8,216,350 B2
(45) Date of Patent: Jul. 10, 2012

(54) DRYER FOR AIR SUSPENSION FOR VEHICLE

(75) Inventors: Yutaro Honjo, Owariasahi (JP); Hiroyuki Uehara, Anjo (JP); Tadahiro Kitamura, Kariya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 386 days.

(21) Appl. No.: 12/648,348

(22) Filed: Dec. 29, 2009

(65) Prior Publication Data

US 2010/0206168 A1    Aug. 19, 2010

(51) Int. Cl.
*B01D 53/04*     (2006.01)
*B01D 53/26*     (2006.01)

(52) U.S. Cl. .......... 96/139; 96/152; 55/517; 55/DIG. 17

(58) Field of Classification Search .............. 96/134, 96/137, 139, 152; 55/517, 518, DIG. 17
See application file for complete search history.

(56) References Cited

U.S. PATENT DOCUMENTS

| 5,129,927 A * | 7/1992 | Tsubouchi | 96/113 |
| 5,286,283 A * | 2/1994 | Goodell | 96/113 |
| 7,100,372 B2 | 9/2006 | Ohshita et al. | |
| 7,544,234 B2 * | 6/2009 | Fornof | 96/117.5 |
| 7,846,242 B2 * | 12/2010 | Paling et al. | 96/134 |
| 2012/0006198 A1 * | 1/2012 | Honjo | 96/139 |

FOREIGN PATENT DOCUMENTS

| JP | 5-201329 A | 8/1993 |
| JP | 7-328373 A | 12/1995 |
| JP | 2002-119824 A | 4/2002 |
| JP | 2002-306922 A | 10/2002 |
| JP | 2003-286956 A | 10/2003 |
| JP | 2004-204725 A | 7/2004 |

\* cited by examiner

*Primary Examiner* — Frank Lawrence, Jr.
(74) *Attorney, Agent, or Firm* — Buchanan Ingersoll & Rooney PC

(57) ABSTRACT

A dryer for an air suspension for a vehicle, includes a housing having an inlet port and an outlet port, a desiccant disposed between first and second filters within the housing, and a guide member including a shielding cylinder portion and a plate portion having plural communication holes, wherein the guide member is disposed between the inlet port and the first filter positioned closer to the inlet port, supports the first filter and the desiccant and guides a fluid to the desiccant, the shielding cylinder portion includes an opening and forms a flow passage for guiding the fluid, the fluid is guided to the desiccant from the inlet port via the shielding cylinder portion, and the flow passage and the communication holes, so that the fluid is dried by the desiccant and is then discharged from the dryer as a dry air to the air suspension for the vehicle.

7 Claims, 3 Drawing Sheets

DRYER FOR AIR SUSPENSION FOR VEHICLE

CROSS REFERENCE TO RELATED APPLICATIONS

This application is based on and claims priority under 35 U.S.C. §119 to Japanese Patent Application 2009-033462, filed on Feb. 17, 2009, the entire content of which is incorporated herein by reference.

TECHNICAL FIELD

This disclosure generally relates to a dryer for an air suspension for a vehicle. More specifically, this disclosure pertains to a dryer for an air suspension for drying a fluid introduced into a housing by means of a desiccant and supplying dry air to the air suspension for the vehicle.

BACKGROUND

Disclosed in JP2002-119824A is an air dryer that dries a compressed air, which is obtained by compressing air by means of a compressor provided separately from the air dryer, and then sends the compressed and dried air to an air control system provided separately from the air dryer. According to the air dryer disclosed in JP2002-119824A, a housing, which is formed in a substantially cylindrical shape, includes a compressor-side port, which is connected to the compressor provided separately from the air dryer, at one end surface of the housing in an axial direction thereof and a system-side port, which is connected to the air control system, at the other end surface of the housing in the axial direction. Furthermore, the housing is filled with a desiccant (a drying agent). The desiccant, which is provided within the housing, dehumidifies the air passing through the housing from the compressor to the air control system. More specifically, when the air passes through the housing, moisture contained within the air is absorbed to the desiccant, thereby dehumidifying the compressed air. Generally, a dehumidifying function of the desiccant gradually decreases as an amount of moisture absorbed by the desiccant increases. Therefore, in order to continuously use the air dryer, the air, which has already dehumidified and which exists within the air control system, needs to be returned to the compressor via the air dryer, so that the moisture absorbed in the desiccant is returned to the dry air in order to reduce the amount of the moisture absorbed to the desiccant, thereby restoring the desiccant. As a result, the dehumidifying function of the air dryer is restored. Additionally, the air dryer disclosed in JP2002-119824A may still remove moisture condensed within the housing even in a case where the air dryer is transversely arranged within a vehicle and like.

Disclosed in JPH7-328373A is a moisture removing device that includes a liquid separator and a dryer. The liquid separator includes a tangential inflow type cyclone, into which air containing moisture in a vapor phase and a liquid phase flows, and a water recovering housing defining a passage expanding chamber. Furthermore, an inner cylinder of the cyclone, whose passage is enlarged towards an opening portion thereof, protrudes towards the passage expanding chamber. An annular groove for collecting liquid moisture is formed around the inner cylinder, which protrudes towards the passage expanding chamber. The dryer is provided at a downstream side of the flow of the air relative to the liquid separator and is filled with solid desiccant.

Disclosed in JPH5-201329A is an air-hydraulic composite brake system for a vehicle in which a compressed air, which is obtained by compressing air by means of an air compressor, is stored within an air tank and a braking operation is performed by the compressed air on the basis of an operation of a brake pedal. Furthermore, JPH5-201329A discloses a configuration in which the air-hydraulic composite brake system includes an air dryer for removing moisture contained in the compressed air by means of a desiccant and an electrostatic purifier for removing oil mist contained in the compressed air at a prior stage of drying the air. The oil mist is removed from the compressed air, which is obtained by compressing the air by means of the air compressor, by the electrostatic purifier, and then, the compressed air is stored within the air tank. Additionally, there exist various vapor-liquid separating devices.

The dryer disclosed in JP2002-119824A is relatively large, therefore, a relatively large space needs to be prepared at the vehicle in order to mount the dryer thereto. The cyclone type dryer disclosed in JPH7-328373A and the electrostatic type dryer disclosed in JPH5-201329A have relatively complex structures and manufacturing costs are relatively high.

A need thus exists to provide a dryer for an air suspension for a vehicle which is not susceptible to the drawback mentioned above.

SUMMARY

According to an aspect of this disclosure, a dryer for an air suspension for a vehicle, includes a housing having an inlet port at an end portion thereof in an axial direction thereof and an outlet port at the other end portion in the axial direction, a desiccant disposed between first and second filters, which are accommodated within the housing, and a guide member including a shielding cylinder portion whose inner surface and a cover surface serve as shielding surfaces, and a plate portion having a plurality of communication holes at a radially outer portion thereof relative to the shielding cylinder portion, wherein the guide member is disposed between the inlet port and the first filter positioned closer to the inlet port, supports the first filter and the desiccant and guides a fluid to the desiccant via the first filter, the shielding cylinder portion includes an opening whose opening area is set to be equal to or greater than an opening area of the inlet port, so that the shielding cylinder portion surrounds the inlet port while forming a flow passage for guiding the fluid from the inlet port to the first filter positioned closer to the inlet port, and the fluid is introduced into the shielding cylinder portion of the guide member from the inlet port, and then to the communication holes formed at the plate portion via the flow passage, so that the fluid guided to the desiccant is dried by means of the desiccant and is then discharged from the dryer as a dry air to the air suspension for the vehicle.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

First Embodiment

Figure 5:
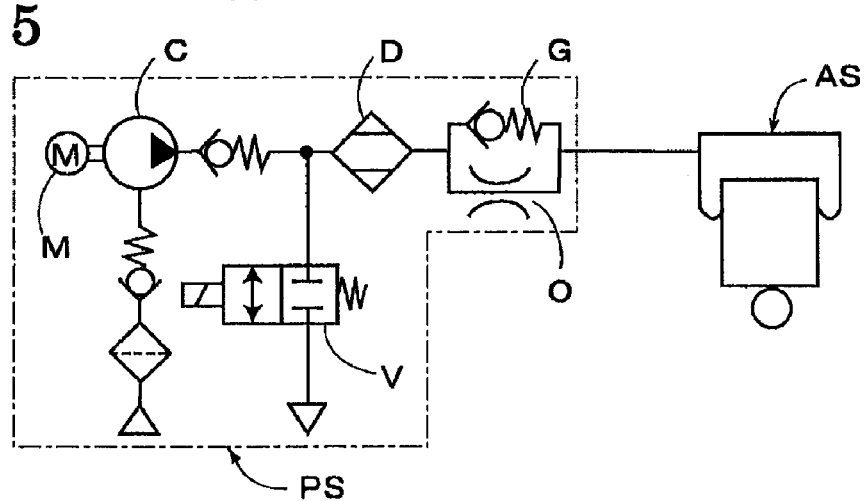
FIG. 5 is a block diagram illustrating an air supply source having a general dryer for an air suspension.

A first embodiment of a dryer for an air suspension for a vehicle (which will be hereinafter referred to simply as a dryer) will be described below with reference to the attached drawings. Firstly, an air supply source PS having the dryer will be described below with reference to FIG. 5. The air supply source PS supplies compressed air to an air spring means AS for the air suspension (which will be hereinafter referred to as the air spring means AS). More specifically, the air supply source PS is configured so that dried and pressurized (compressed) air is outputted to the air spring means AS via a dryer D and a check valve G when a compressor C is actuated by means of a motor M. Furthermore, in a case where an air release valve V, which is configured with a normally-closed electromagnetic on-off valve, is turned to be at an opened position while the compressor C is not driven, air is released to an outside of the air supply source PS via an orifice O and the dryer D, so that the dryer D is restored when the air is released. Additionally, a control valve is provided between the air supply source PS and the air spring means AS.

Figure 1:
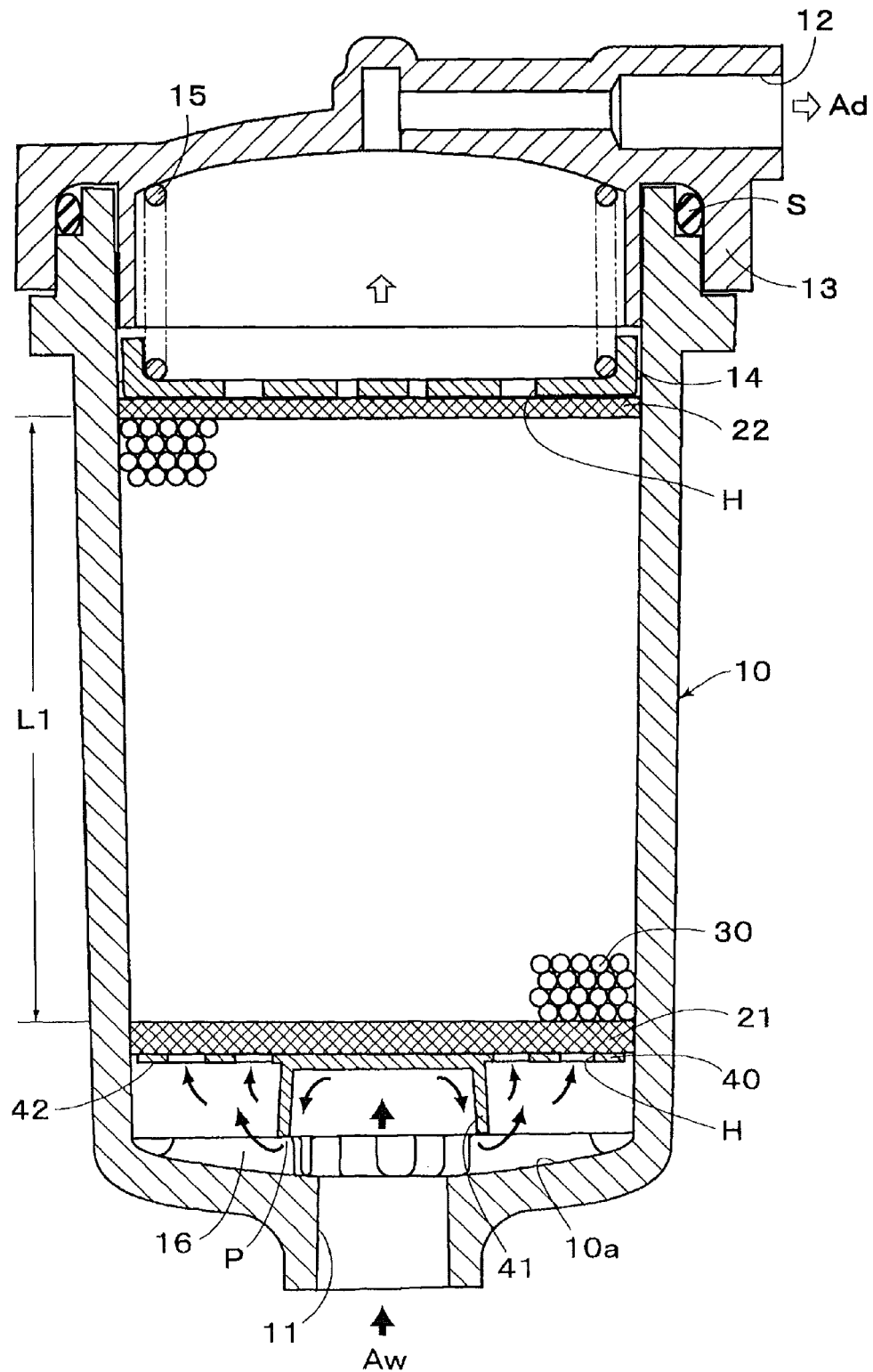
FIG. 1 is a cross-sectional view of a dryer for an air suspension for a vehicle according to a first embodiment.

As illustrated in FIG. 1, the dryer D includes a housing 10, a pair of filters 21 and 22 (first and second filters) and a desiccant 30 (a drying agent). The housing 10 is formed in a cylinder shape having an inlet port 11 at one end portion thereof in an axial direction of the housing 10 and an outlet port 12 at the other end portion of the housing 10 in the axial direction. The filters 21 and 22 and the desiccant 30 are accommodated within the housing 30 in a manner where the desiccant 30 is disposed between the filters 21 and 22. A fluid Aw (i.e. the compressed air outputted from the motor M and containing moisture), which is introduced into the housing 10 of the dryer D from the inlet port 11 via a guide member 40, is dried by means of the desiccant 30, so that dry air Ad is outputted from the outlet port 12 and is supplied to the air spring means AS. In this embodiment, a granular silica gel is used as the desiccant 30.

The housing 10 is formed in the cylinder shape having a bottom cover portion. Furthermore, a cover portion 13 is attached at an opening portion of the housing 10 via an annular-shaped seal S (i.e. while disposing the annular-shaped seal S between the cover portion 13 and an end portion of the housing at an opening side). The outlet port 12 is formed at the cover portion 13. A support plate 14 having plural communication holes H is provided within the housing 10 so as to closely contact the filter 22. A compression spring 15 is disposed between the cover portion 13 and the support plate 14, so that the desiccant 30 is downwardly pressed in FIG. 1 by means of the compression spring 15 via the support plate 14 and the filter 22. More specifically, the desiccant 30 is disposed between the filters 21 and 22 by a biasing force generated by the compression spring 15 (i.e. the desiccant 30 is accommodated within a desiccant accommodating chamber that is defined by the filters 21 and 22) while ensuring flow passages between granules, which configure the desiccant 30.

Figure 2:
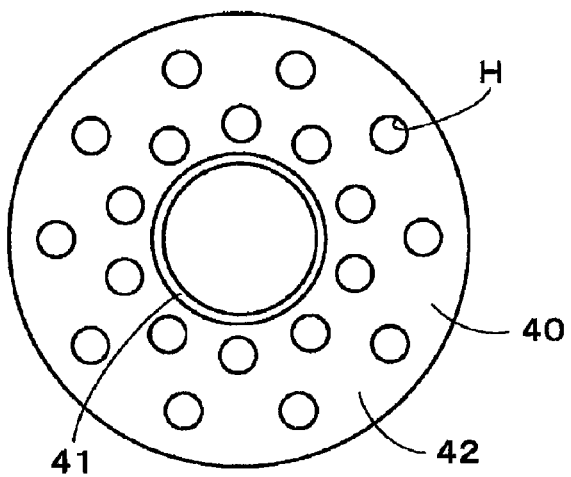
FIG. 2 is a plane view of a guide member.

As illustrated in FIG. 1, the guide member 40 is disposed between the inlet port 11 and the filter 21, which is arranged at a position closer to the inlet port 11 relative to the outlet port 12 (i.e. at a lower side in FIG. 1), so that the filter 21 and the desiccant 30 are supported by the guide member 40. The fluid Aw is guided into the desiccant accommodating chamber (i.e. the desiccant 30) via the filter 21. As illustrated in FIGS. 1 and 2, the guide member 40 includes a shielding cylinder portion 41 and a plate portion 42 having plural communication holes H. More specifically, the holes H are formed at the plate portion 42 at radially outer portions thereof relative to the shielding cylinder portion 41. The shielding cylinder portion 41 is formed in a cup shape having an opening, whose opening area (i.e. diameter in this embodiment) is set to be equal to or greater than an opening area (i.e. a diameter in this embodiment) of the inlet port 11. An inner circumferential surface and a cover surface, which is formed at a position opposite from the opening, of the shielding cylinder portion 41 serve as shielding surfaces. Furthermore, the shielding cylinder portion 41 is arranged so as to surround (i.e. so as to cover) the inlet port 11. A flow passage P for guiding the flow Aw to the filter 21 from the inlet port 11 is formed as follows.

Figure 3:
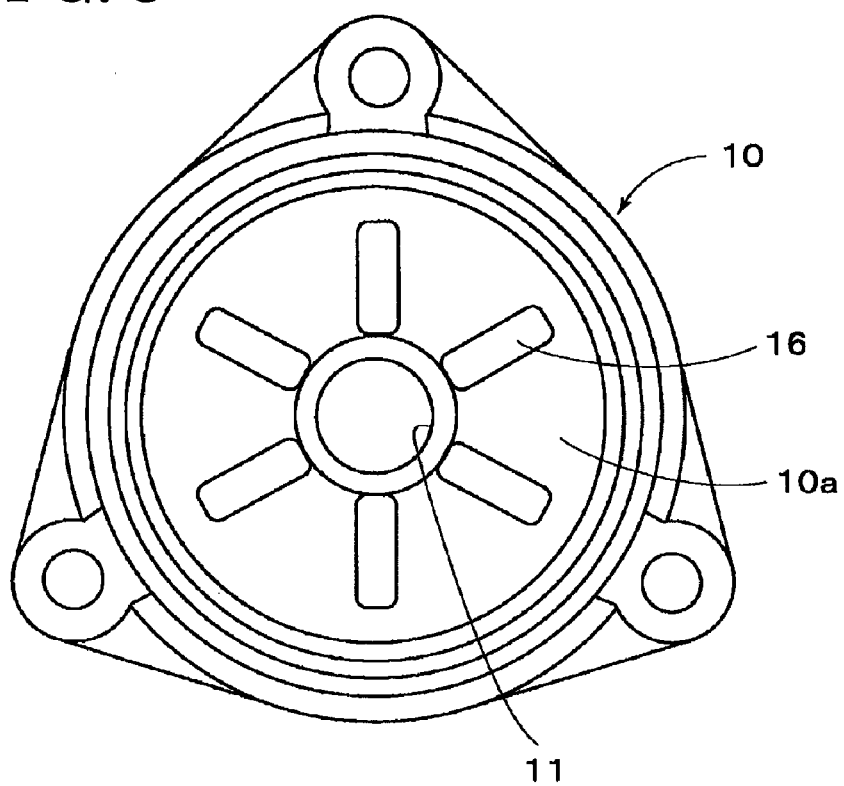
FIG. 3 is a plane view illustrating a bottom portion of a housing.

As illustrated in FIGS. 1 and 3, an end surface of the housing 10 positioned closer to the inlet port 11 (i.e. at the lower side in FIG. 1) in an axial direction of the housing 10 is inclined so as to form an inclined surface 10a, whose cross-sectional area gradually decreases from an inner circumferential surface of the housing 10 towards the inlet port 11. Plural ribs 16 are provided at the inclined surface 10a at regular intervals in a circumferential direction of the inlet port 11 so as to extend in the axial direction of the housing 10. Furthermore, as illustrated in FIG. 1, the guide member 40 is arranged so that an end surface of the shielding cylinder portion 41 contacts end surfaces of the respective ribs 16, thereby forming the flow passages P, which are defined by the ribs 16 and the end surface of the shielding cylinder portion 41.

In this embodiment, the shielding cylinder portion 41 and the plate portion 42 are integrally formed by means of resin to configure the guide member 40. However, the guide member 40 may be modified so that the shielding cylinder portion 41 and the plate portion 42 are separately formed and the shielding cylinder portion 41 is fixed to the plate portion 42 to integrally form the guide member 40. In this case, the shielding cylinder portion 41 may be made of resin and the plate portion 42 may be made of metal.

As indicated by black arrows in FIG. 1, the fluid Aw is introduced into the shielding cylinder portion 41 of the guide member 40 via the inlet port 11, and then, the fluid Aw inertially hits the shielding surface of the shielding cylinder portion 1, so that the moisture contained in the fluid Aw is separated. Additionally, the separated moisture is collected at a downstream side of a flow of the fluid Aw and accordingly, the separated moisture is discharged to the outside of the housing 10. Furthermore, the fluid Aw is guided through the communication holes H of the plate portion 42 via the flow passages P to the desiccant accommodating chamber, within which the desiccant 30 is accommodated, so that the fluid Aw is dried by means of the desiccant 30. Accordingly, the fluid Aw is transformed into the dry air Ad through the desiccant accommodating chamber (i.e. through the desiccant 30). The dry air Ad is discharged from the outlet port 12 and is supplied to the air spring means AS (see FIG. 5).

Accordingly, the dryer D according to the embodiment achieves an appropriate drying performance even if an amount of the desiccant 30 is largely reduced when comparing to a known dryer. Therefore, a size L1 (i.e. a size of the desiccant accommodating portion) between the filters 21 and 22 in the axial direction is reduced by substantially half when comparing to a size between filters (i.e. a size of a desiccant accommodating chamber) in an axial direction of a housing of the known dyer for the air suspension. As a result, a size of the entire dryer D may be largely reduced. Additionally, as described above, in the case where the air release valve V, which is configured with the normally-closed type electromagnetic on-off valve, is turned to be at the opened position while the compressor C is not driven, the air is discharged to the outside of the housing 10 via the orifice O and the dryer D, so that the desiccant 30 is restored. Accordingly, the desiccant 30 may be continuously used without a need for replacement.

Second Embodiment

Figure 4:
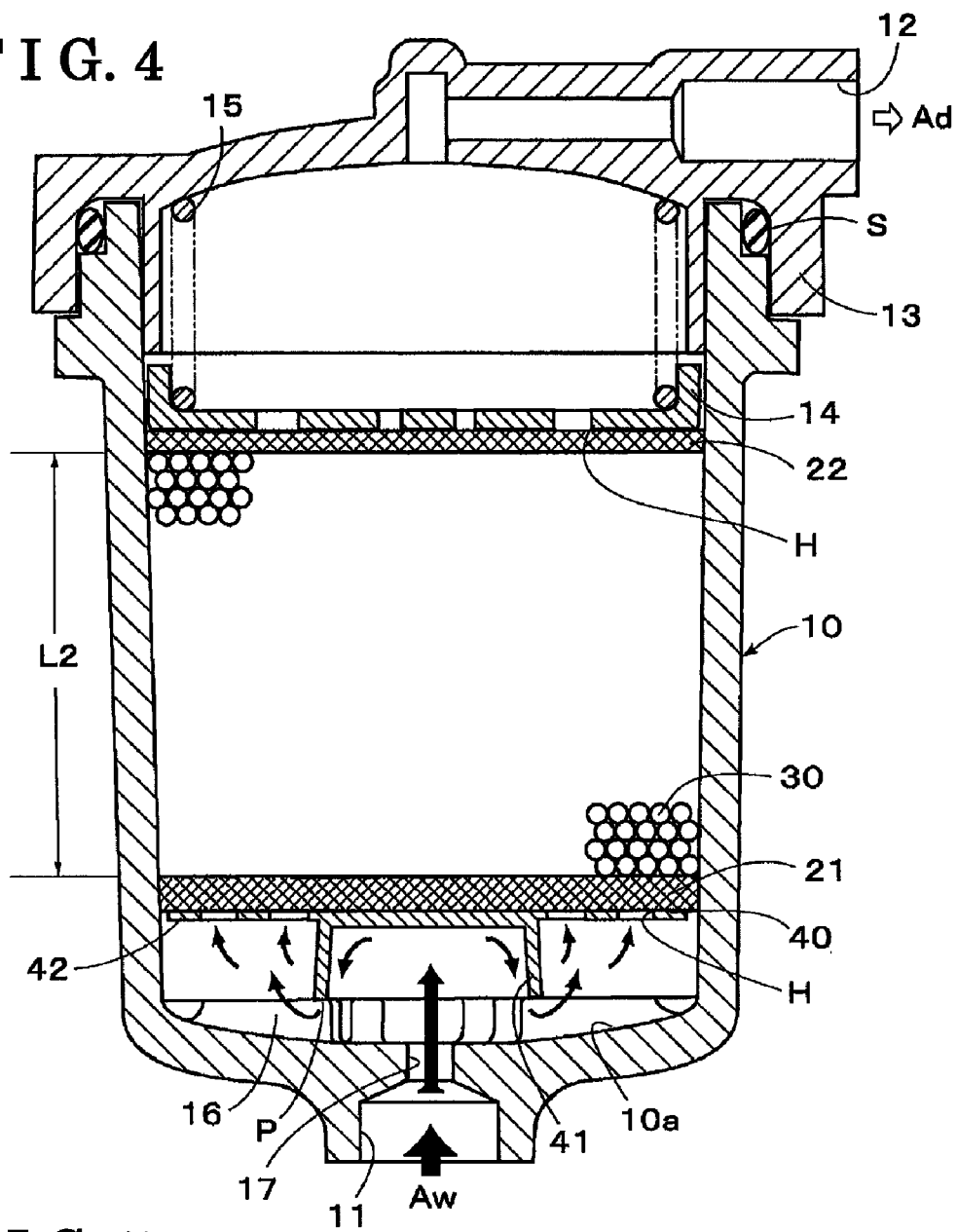
FIG. 4 is a cross-sectional view of a dryer for an air suspension for a vehicle according to a second embodiment.

A second embodiment of the dryer D will be described below. As illustrated in FIG. 4, an orifice 17 is formed at the housing 10, so that the fluid Aw is introduced into the shielding cylinder portion 41 via the inlet port 11 while a flow speed of the fluid Aw is increased by means of the orifice 17. Other configurations of the dryer for the air suspension according to the second embodiment are similar to the first embodiment. Therefore, only the differences between the first embodiment and the second embodiment will be described below. Furthermore, substantially identical elements in FIG. 4 are identified with identical reference numbers and symbols as the first embodiment. In the second embodiment, as illustrated in black arrows in FIG. 4, the fluid Aw is introduced into the shielding cylinder portion 41 of the guide member 40 via the inlet port 11 while the flow speed of the fluid Aw is increased by means of the orifice 17. The moisture contained in the fluid Aw is separated by the shielding cylinder portion 41, therefore, the drying performance may be further enhanced.

Accordingly, as illustrated in FIG. 4, a size L2 between the filters 21 and 22 of the housing 10 (i.e. the size of the desiccant accommodating portion) in the axial direction is further reduced when comparing to the size L1 between the filters 21 and 22 in the axial direction according to the first embodiment. As a result, a mountability of the dryer D according to the second embodiment to a vehicle may be further enhanced.

According to the second embodiment, the housing 10 includes the orifice 17 for increasing the flow speed of the fluid Aw, which is introduced into the shielding cylinder portion 41 of the guide member 40 from the inlet port 11.

According to the embodiments, the guide member 40 includes the shielding cylinder portion 41 and the plate portion 42, which are formed separately and which are integrally fixed with each other.

According to the embodiments, the housing 10 includes the inclined surface 10a at the end surface thereof positioned closer to the inlet port 11 so that the cross-sectional area of the inclined surface 10a gradually decreases from the inner circumferential surface of the housing 10 towards the inlet port 11. Furthermore, plural ribs 16 are provided at the inclined surface 10a so as to extend in the axial direction. The guide member 40 is arranged so that the end surface of the shielding cylinder portion 41 contacts the end surfaces of the respective ribs 16 in order to form plural flow passages P, which are defined between the ribs 16 and the end surface of the shielding cylinder portion 41.

Accordingly, the fluid Aw is dried by means of the desiccant 30 in the manner where: the fluid Aw is introduced into the shielding cylinder portion 41 of the guide member 40 from the inlet port 11; the fluid Aw inertially hits the shielding surface of the shielding cylinder portion 41, so that the moisture contained within the fluid Aw is separated; the fluid Aw then is appropriately guided through the communication holes H formed at the plate portion 42 via the flow passages P; and the fluid Aw is dried by means of the desiccant 30. Accordingly, the fluid Aw is transformed into the dry air Ad through the dryer D and the dry air Ad is discharged from the outlet port 12. In other words, the drying performance of the dryer D may be exerted even if the desiccant 30 provided within the housing 10 is largely reduced when comparing to a known dryer. As a result, the size of the desiccant accommodating portion (i.e. the size L1 and L2) of the housing 10 in the axial direction may be largely reduced when comparing to a known dyer while the dryer D according to the embodiments achieves a simple configuration and reduction in manufacturing costs.

Furthermore, according to the second embodiment in which the orifice 17 is formed at the housing 10, the fluid Aw is introduced into the shielding cylinder portion 41 while the flow speed of the fluid Aw is increased by means of the orifice 17, so that the moisture contained within the fluid Aw is effectively separated. Accordingly, the drying performance is further enhanced. As a result, the size of the desiccant accommodating portion (i.e. the size L2) in the axial direction may be further reduced, which may result in further enhancing the mountability of the dryer D to the vehicle. More specifically, in the case where the housing 10 having plural ribs 16 at the inclined surface 10a is used, the flow passages P are formed between the ribs 16 and the end surface of the shielding cylinder portion 41. Accordingly, the fluid Aw is appropriately guided into the housing 10 without separately forming a flow passage separately at the housing 10.

The principles, preferred embodiment and mode of operation of this disclosure have been described in the foregoing specification. However, the disclosure which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the disclosure. Accordingly, it is expressly intended that all such variations, changes and equivalents which fall within the spirit and scope of the disclosure as defined in the claims, be embraced thereby.

The invention claimed is:

1. A dryer for an air suspension for a vehicle, comprising:
a housing having an inlet port at an end portion thereof in an axial direction thereof and an outlet port at the other end portion in the axial direction;
a desiccant disposed between first and second filters, which are accommodated within the housing; and
a guide member including a shielding cylinder portion whose inner surface and a cover surface serve as shielding surfaces and a plate portion having a plurality of communication holes at a radially outer portion thereof relative to the shielding cylinder portion, wherein
the guide member is disposed between the inlet port and the first filter positioned closer to the inlet port, supports the first filter and the desiccant and guides a fluid to the desiccant via the first filter,
the shielding cylinder portion includes an opening whose opening area is set to be equal to or greater than an opening area of the inlet port, so that the shielding cylinder portion surrounds the inlet port while forming a flow passage for guiding the fluid from the inlet port to the first filter positioned closer to the inlet port, and
the fluid is introduced into the shielding cylinder portion of the guide member from the inlet port, and then to the communication holes formed at the plate portion via the flow passage, so that the fluid guided to the desiccant is dried by means of the desiccant and is then discharged from the dryer as a dry air to the air suspension for the vehicle.

2. The dryer for the air suspension for the vehicle according to claim 1, wherein the housing includes an orifice for increasing a flow speed of the fluid, which is introduced into the shielding cylinder portion of the guide member from the inlet port.

3. The dryer for the air suspension for the vehicle according to claim 1, wherein the guide member includes the shielding cylinder portion and the plate portion, which are formed separately and which are integrally fixed with each other.

4. The dryer for the air suspension for the vehicle according to claim 1, wherein the housing includes an inclined surface at an end surface thereof positioned closer to the inlet port so that a cross-sectional area of the inclined surface gradually decreases from an inner circumferential surface of the housing towards the inlet port, a plurality of ribs are provided at the inclined surface so as to extend in the axial direction, the guide member is arranged so that an end surface of the shielding cylinder portion contacts end surfaces of the respective ribs and wherein, the plurality of flow passages are defined between the ribs and the end surface of the shielding cylinder portion.

5. The dryer for the air suspension for the vehicle according to claim 2, wherein the guide member includes the shielding cylinder portion and the plate portion, which are formed separately and which are integrally fixed with each other.

6. The dryer for the air suspension for the vehicle according to claim 2, wherein the housing includes an inclined surface at an end surface thereof positioned closer to the inlet port so that a cross-sectional area of the inclined surface gradually decreases from an inner circumferential surface of the housing towards the inlet port, a plurality of ribs are provided at the inclined surface so as to extend in the axial direction, the guide member is arranged so that an end surface of the shielding cylinder portion contacts end surfaces of the respective ribs and wherein, the plurality of flow passages are defined between the ribs and the end surface of the shielding cylinder portion.

7. The dryer for the air suspension for the vehicle according to claim 3, wherein the housing includes an inclined surface at an end surface thereof positioned closer to the inlet port so that a cross-sectional area of the inclined surface gradually decreases from an inner circumferential surface of the housing towards the inlet port, a plurality of ribs are provided at the inclined surface so as to extend in the axial direction, the guide member is arranged so that an end surface of the shielding cylinder portion contacts end surfaces of the respective ribs and wherein, the plurality of flow passages are defined between the ribs and the end surface of the shielding cylinder portion.

* * * * *

UNITED STATES PATENT AND TRADEMARK OFFICE
CERTIFICATE OF CORRECTION

| | | |
|---|---|---|
| PATENT NO. | : 8,216,350 B2 | Page 1 of 1 |
| APPLICATION NO. | : 12/648348 | |
| DATED | : July 10, 2012 | |
| INVENTOR(S) | : Yutaro Honjo et al. | |

It is certified that error appears in the above-identified patent and that said Letters Patent is hereby corrected as shown below:

Title Page

Insert the following heading:

-- (30)    Foreign Application Priority Data

Feb. 17, 2009    (JP) ................................. 2009-033462 --

Signed and Sealed this
Ninth Day of October, 2012

David J. Kappos
*Director of the United States Patent and Trademark Office*